US012539368B2

United States Patent
Chen et al.

(10) Patent No.: US 12,539,368 B2
(45) Date of Patent: Feb. 3, 2026

(54) MEDICAMENT DELIVERY DEVICE

(71) Applicant: SHL MEDICAL AG, Zug (CH)

(72) Inventors: Hsueh-Yi Chen, New Taipei (TW); Pei Chi Hu, New Taipei (TW); Chun-Yi Lee, Taoyuan (TW)

(73) Assignee: SHL Medical AG, Zug (CH)

( * ) Notice: Subject to any disclaimer, the term of this patent is extended or adjusted under 35 U.S.C. 154(b) by 769 days.

(21) Appl. No.: 17/911,016

(22) PCT Filed: Nov. 27, 2020

(86) PCT No.: PCT/EP2020/083767
§ 371 (c)(1),
(2) Date: Sep. 12, 2022

(87) PCT Pub. No.: WO2021/204410
PCT Pub. Date: Oct. 14, 2021

(65) Prior Publication Data
US 2023/0096391 A1    Mar. 30, 2023

(30) Foreign Application Priority Data
Apr. 8, 2020 (EP) ...................................... 20168617

(51) Int. Cl.
*A61M 5/24* (2006.01)
*A61M 5/20* (2006.01)
(Continued)

(52) U.S. Cl.
CPC ................ *A61M 5/24* (2013.01); *A61M 5/20* (2013.01); *A61M 5/31501* (2013.01);
(Continued)

(58) Field of Classification Search
CPC ...... A61M 5/24; A61M 5/20; A61M 5/31501; A61M 5/3257; A61M 5/3243;
(Continued)

(56) References Cited

U.S. PATENT DOCUMENTS

2013/0274655 A1* 10/2013 Jennings ............. A61M 5/3213
604/152
2016/0296699 A1* 10/2016 Cabiri ..................... A61M 5/20

FOREIGN PATENT DOCUMENTS

| EP | 3067082 A1 | 9/2016 |
| WO | 2019/122946 A1 | 6/2019 |

OTHER PUBLICATIONS

International Search Report and Written Opinion for Int. App. No. PCT/EP2020/083767, mailed Dec. 23, 2020.

* cited by examiner

*Primary Examiner* — Tasnim Mehjabin Ahmed
(74) *Attorney, Agent, or Firm* — McDonnell Boehnen Hulbert & Berghoff LLP

(57) ABSTRACT

A medicament delivery device is presented having a front-end device with a front-end housing and a delivery member cover that moves along a longitudinal axis between an extended position and a retracted position relative to the front-end housing, and a medicament container holder arranged in the front-end housing that receives a medicament container; and a reusable base device that is detachably connected to the front-end device, the base device has a plunger, a motor to drive the plunger inside the front-end housing, and wherein the motor drives the plunger from a second end position back to an initial end position, and a motor switch having a first switch position that changes to a default switch position by displacement of the delivery member cover when the delivery member cover is moved back from a retracted position to an extended position causing the motor to rotate in a reverse direction and drive the plunger from the second end position to the initial end position.

16 Claims, 5 Drawing Sheets

(51) Int. Cl.
*A61M 5/315* (2006.01)
*A61M 5/32* (2006.01)
*A61M 5/31* (2006.01)

(52) U.S. Cl.
CPC ... *A61M 5/3257* (2013.01); *A61M 2005/2013* (2013.01); *A61M 2005/3142* (2013.01); *A61M 2005/31518* (2013.01); *A61M 2005/31588* (2013.01); *A61M 5/3243* (2013.01); *A61M 2205/3306* (2013.01); *A61M 2205/50* (2013.01); *A61M 2205/6054* (2013.01); *A61M 2205/6063* (2013.01)

(58) Field of Classification Search
CPC .. A61M 2005/2013; A61M 2005/3142; A61M 2005/31518; A61M 2005/31588; A61M 2205/3306; A61M 2205/50; A61M 2205/6054; A61M 2205/6063
See application file for complete search history.

MEDICAMENT DELIVERY DEVICE

CROSS REFERENCE TO RELATED APPLICATION

The present application is a U.S. National Phase Application pursuant to 35 U.S.C. § 371 of International Application No. PCT/EP2020/083767 filed Nov. 27, 2020, which claims priority to European Patent Application No. 20168617.7 filed Apr. 8, 2020. The entire disclosure contents of these applications are herewith incorporated by reference into the present application.

TECHNICAL FIELD

The present disclosure generally relates to a medicament delivery device of a type including a front-end device and a base device that can be attached to each other.

BACKGROUND

Medicament delivery devices may comprise a disposable cassette which includes a delivery member such as a needle and the medicament container provided with the drug. Such cassettes may be connected to a reusable base member provided with a plunger and a motor configured to drive the plunger into the medicament container such that the drug can be expelled through the delivery member.

An example of such a device is disclosed in US 2013/0274655 A1. This document discloses an auto-injector for administering a dose of a liquid medicament. The auto-injector comprises a front-end device adapted to contain a syringe with an injection needle and a barrel containing the dose of medicament. The front-end device comprises a needle shroud adapted to rest on the skin of a patient receiving an injection. The auto-injector also comprises a reusable back-end device comprising a housing, a plunger connected to or adapted to engage a stopper providing a fluid tight seal for a distal end of the barrel, and a motor for displacing the plunger connected to the stopper. The front-end device is attachable to the back-end device. The needle shroud is slidably arranged with respect to the injection needle, and wherein an interlock switch is capable of detecting an axial position of the needle shroud. The needle shroud comprises an extension arm that is adapted to communicate an axial displacement of the needle shroud to the back-end device. A skin interlock shroud is formed to a distal end to the extension arm, which interacts with the interlock switch. The interlock switch detects the displacement of the needle shroud to determine if the needle shroud is in contact with the skin of the patient. The back-end device may comprise a mechanism that allows for the activation of the motor only if the contact with the needle shroud is detected.

SUMMARY

An object of the present disclosure is to provide a medicament delivery device which solves, or at least mitigates problems of the prior art.

In the present disclosure, when the term "distal direction" is used, this refers to the direction pointing away from the dose delivery site during use of the medicament delivery device. When the term "distal part/end" is used, this refers to the part/end of the delivery device, or the parts/ends of the members thereof, which under use of the medicament delivery device is/are located furthest away from the dose delivery site. Correspondingly, when the term "proximal direction" is used, this refers to the direction pointing towards the dose delivery site during use of the medicament delivery device. When the term "proximal part/end" is used, this refers to the part/end of the delivery device, or the parts/ends of the members thereof, which under use of the medicament delivery device is/are located closest to the dose delivery site.

Further, the term "longitudinal", "longitudinally", "axially" or "axial" refer to a direction extending from the proximal end to the distal end, typically along the device or components thereof in the direction of the longest extension of the device and/or component.

Similarly, the terms "transverse", "transversal", "transversally" refer to a direction generally perpendicular to the longitudinal direction.

In the present disclosure, when the term "distal direction" is used, this refers to the direction pointing away from the dose delivery site during use of the medicament delivery device. When the term "distal part/end" is used, this refers to the part/end of the delivery device, or the parts/ends of the members thereof, which under use of the medicament delivery device is/are located furthest away from the dose delivery site. Correspondingly, when the term "proximal direction" is used, this refers to the direction pointing towards the dose delivery site during use of the medicament delivery device. When the term "proximal part/end" is used, this refers to the part/end of the delivery device, or the parts/ends of the members thereof, which under use of the medicament delivery device is/are located closest to the dose delivery site.

Further, the term "longitudinal", "longitudinally", "axially" or "axial" refer to a direction extending from the proximal end to the distal end, typically along the device or components thereof in the direction of the longest extension of the device and/or component.

Similarly, the terms "transverse", "transversal", "transversally" refer to a direction generally perpendicular to the longitudinal direction.

There is hence provided a medicament delivery device comprising: a front-end device comprising: a front-end housing and a delivery member cover configured to be moved along its longitudinal axis between an extended position and a retracted position relative to the front-end housing, and a medicament container holder arranged in the front-end housing, configured to receive a medicament container; and a reusable base device configured to be detachably connected to the front-end device, the base device comprising: a plunger, a motor configured to drive the plunger from an initial end position to a second end position, causing the plunger to move inside the front-end housing towards a front end of the front-end device, and wherein the motor is configured to drive the plunger from the second end position back to the initial end position, and a motor switch configured to be actuated from a first switch position to a default switch position by displacement of the delivery member cover when the delivery member cover is moved back from the retracted position towards the extended position, the motor switch thereby causing the motor to start to rotate in a reverse direction and drive the plunger from the second end position back towards the initial end position.

The plunger will thereby be driven back towards the initial position when the delivery member cover is moved towards the extended position. Thus, when the medicament delivery has been performed, the plunger is returned to its initial end position. This way, the base device is set up for connection with a new front-end device.

According to one embodiment the motor switch is configured to be actuated from the default switch position to the first switch position by displacement of the delivery member cover when the delivery member cover is moved from the extended position towards the retracted position, the motor switch thereby causing the motor to start to rotate in a forward direction and drive the plunger from the initial end position towards the second end position. The plunger is hence moved towards the second position when the delivery member cover is moved towards the retracted position. Medicament delivery due to the plunger moving towards the retracted position may thereby be initiated.

One embodiment comprises a control unit configured to control the motor to stop when the plunger has reached the second end position. Energy may thereby be saved, as the motor will not continue to try to drive the plunger. Further, the motor can be protected from damage due to overload.

According to one embodiment the control unit is configured to control the motor to stop when the plunger has reached the initial end position.

One embodiment comprises a current detector configured to detect a motor current of the motor, the motor current increasing to a level above a threshold level when the plunger reaches any of the second end position and the initial end position, wherein the control unit is configured to control the motor to stop when the motor current reaches a level above the threshold level.

One embodiment comprises a position sensor configured to detect a position of the plunger, the control unit being configured to control the motor to stop, or change the rotation speed, in response to the position sensor detecting that the plunger attains the initial end position or the second end position.

According to one embodiment the position sensor can be an optical sensor, a capacitance sensor, a magnetic sensor or an encoder.

According to one embodiment the control unit is configured to control the motor to start to rotate in the reverse direction only when the motor is in a standstill state and the motor switch is actuated from the first switch position to the default switch position. Thus, the motor will not be subjected to any sudden directional change, which could cause mechanical damage to the motor.

According to one embodiment the delivery member cover is configured to bear against the motor switch while the delivery member cover is in the retracted position to thereby keep the motor switch in the first switch position. The delivery member cover may hence contact the motor switch as long as the delivery member is in the retracted position.

According to one embodiment the delivery member cover is configured to withdraw from contact with the motor switch when the delivery member cover is moved from the retracted position towards the extended position.

The motor switch may be biased towards the default switch position. Thus, when the delivery member cover is moved from the retracted position, the motor switch may return to the default switch position from the first switch position.

According to one embodiment the base device comprises a driving gear configured to be rotated by the motor, and wherein the plunger comprises a plurality of segments or the plunger comprises a wire plunger rod provided with rack teeth, the driving gear being configured to engage with the segments or rack teeth to drive the plunger between the initial end position and the second end position.

According to one embodiment the delivery member cover is biased towards the extended position.

According to one embodiment the front-end device is disposable. The front-end device may be a single-use disposable device.

According to one embodiment the medicament delivery device is an injector. The medicament delivery device may be an auto-injector.

According to one embodiment the base device comprises electronic circuitry and a user-feedback system, wherein the electronic circuitry is configured to control the user-feedback system, and wherein the base device comprises a connection switch configured to detect when the front-end device is connected to the base device to thereby switch on the electronic circuitry. Actuation of the connection switch by connection of the front-end device to the base device causes an electronic circuit to close such that the electronic circuitry receives power.

According to one embodiment, the medicament delivery device comprising: a front-end device comprising: a front-end housing and a delivery member cover configured to be moved along its longitudinal axis between an extended position and a retracted position relative to the front-end housing, and a medicament container holder arranged in the front-end housing, configured to receive a medicament container; and a reusable base device configured to be detachably connected to the front-end device, the base device comprising: a plunger, a motor configured to drive the plunger from an initial end position to a second end position, causing the plunger to move inside the front-end housing towards a front end of the front-end device, and the motor is configured to drive the plunger from the second end position back to the initial end position, a control unit configured to control the motor to stop; a position sensor configured to detect a position of the plunger, the control unit being configured to control the motor to stop in response to the position sensor detecting the position of the plunger.

According to one embodiment, the medicament delivery device comprising: a front-end device comprising: a front-end housing and a delivery member cover configured to be moved along its longitudinal axis between an extended position and a retracted position relative to the front-end housing, and a medicament container holder arranged in the front-end housing, configured to receive a medicament container; and a reusable base device configured to be detachably connected to the front-end device, the base device comprising: a plunger, a motor configured to drive the plunger from an initial end position to a second end position, causing the plunger to move inside the front-end housing towards a front end of the front-end device, and wherein the motor is configured to drive the plunger from the second end position back to the initial end position, a control unit configured to control the motor to change the rotation speed; a position sensor configured to detect a position of the plunger, the control unit being configured to control the motor to change the rotation speed in response to the position sensor detecting the position of the plunger.

Generally, all terms used in the claims are to be interpreted according to their ordinary meaning in the technical field, unless explicitly defined otherwise herein. All references to "a/an/the element, apparatus, component, means, etc." are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
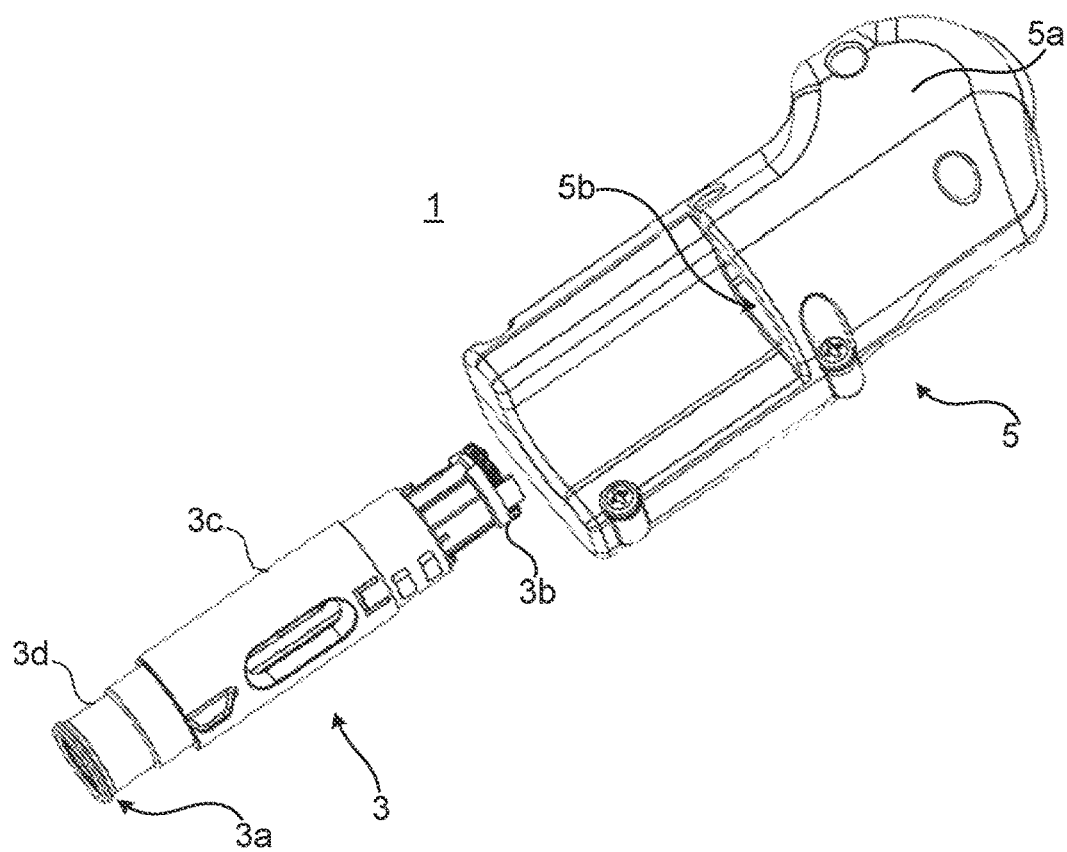
FIG. 1 is a perspective view of an example of a medicament delivery device including a front-end device and a base device.

FIG. 1 shows an example of a medicament delivery device 1. The medicament delivery device 1 may be an injector such as an auto-injector.

The medicament delivery device 1 comprises a front-end device 3 and a base device 5. The front-end device 3 is configured to be attached to the base device 5. The front-end device 3 is configured to be detachable from the base device 5.

In FIG. 1 the medicament delivery device 1 is depicted before the front-end device 3 has been attached to the base device 5.

The base device 5 may be reusable. The front-end device 3 may thus be disposable. The front-end device 3 may hence be a single-use front-end device.

The front-end device 3 has an elongated shape. The front-end device 3 may also be referred to as a "cassette". The front-end device 3 has a front end 3a and a rear end 3b. The front-end device 3 comprises an elongated front-end housing 3c and a delivery member cover 3d configured to be at least partly received by the front-end housing 3c. The delivery member cover 3d is configured to be moved axially relative to the front-end housing 3c. The delivery member cover 3d is configured to be moved between an extended position relative to the front-end housing 3c, shown in FIG. 1, and a retracted position, shown in FIG. 4. The delivery member cover 3d is biased towards the extended position. The delivery member cover 3d is rotationally constrained relative to the front-end housing 3c.

Figure 4:
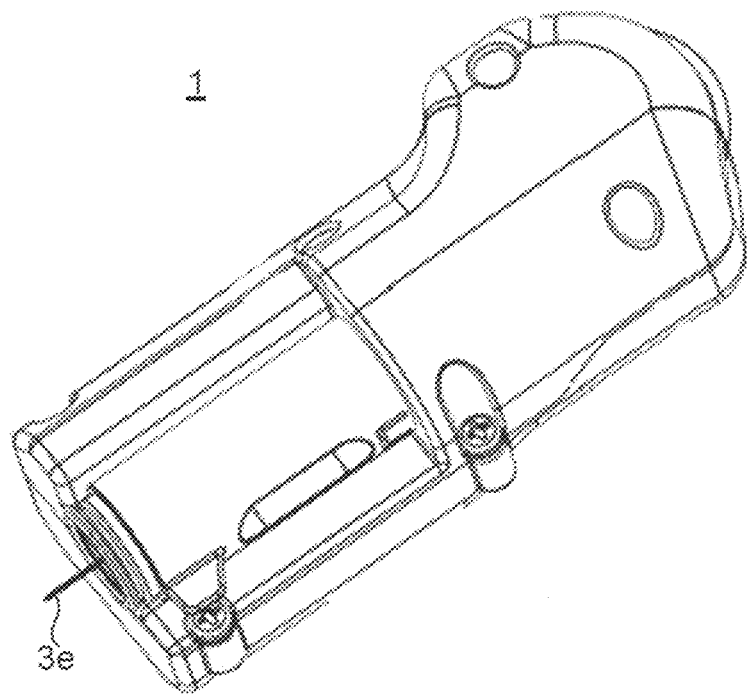
FIG. 4 shows the medicament delivery device when a delivery member cover has been moved from an extended position to a retracted position.

The front-end device 3 comprises a delivery member 3e (shown in FIG. 4). The delivery member 3e is in this example a needle but could alternatively for example be a cannula. The delivery member 3e is exposed in the retracted position of the delivery member cover 3d.

The front-end device 3 is configured to be loaded with a medicament container containing a medicament to be expelled by the delivery member.

In one example, the front-end device 3 optionally comprises a detachable cap; in a preferred example, the front-end device 3 comprises a lock interface and the cap comprises a counter lock interface to engage with the lock interface, so that the cap is locked to the front-end device 3, at least in the axial direction, meaning that the cap is axially immovable relative to the front-end housing 3c. The locking interface and the counter locking interface may be designed to be unlocked once the front-end device 3 is attached to the base device 5. For example, the base device 5 may comprise a protrusion protruding between the cap and the front-end housing, so that the cap can be detached from the front-end housing once the front-end device is attached to the base device.

The base device 5 has a base housing 5a provided with an opening 5b configured to receive the rear end of the front-end device 3.

The base device 5 comprises a drive system configured to drive a stopper arranged in the medicament container of the front-end device 3 to thereby expel medicament from the front-end device 3 through the delivery member.

Figure 2:
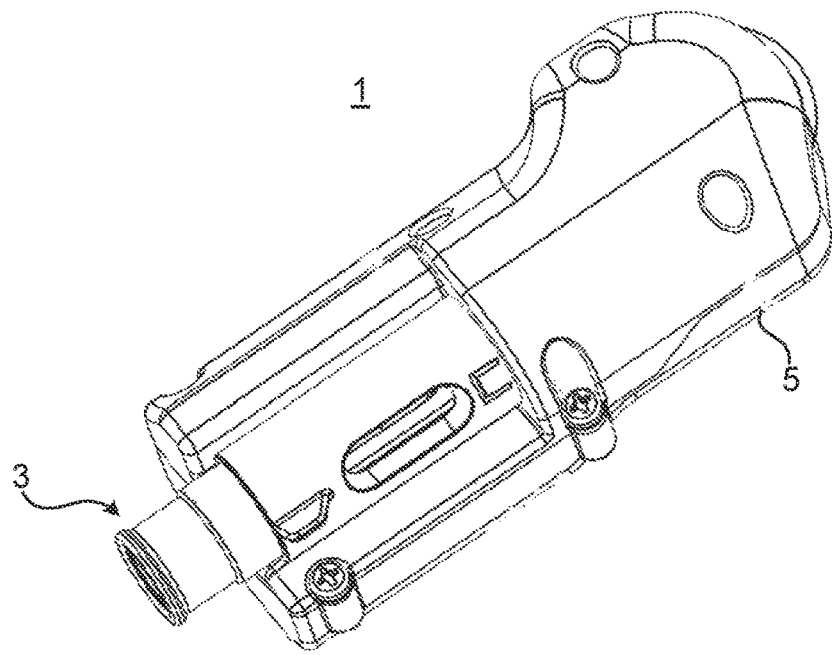
FIG. 2 shows the medicament delivery device in FIG. 1 when the front-end device has is being attached to the base device.

FIG. 2 shows the medicament delivery device 1 in the process when the front-end device 3 is being attached to the base device 5. The rear end 3b of the front-end device 3 is inserted into the opening 5b by linear movement of the front-end device 3.

Figure 3:
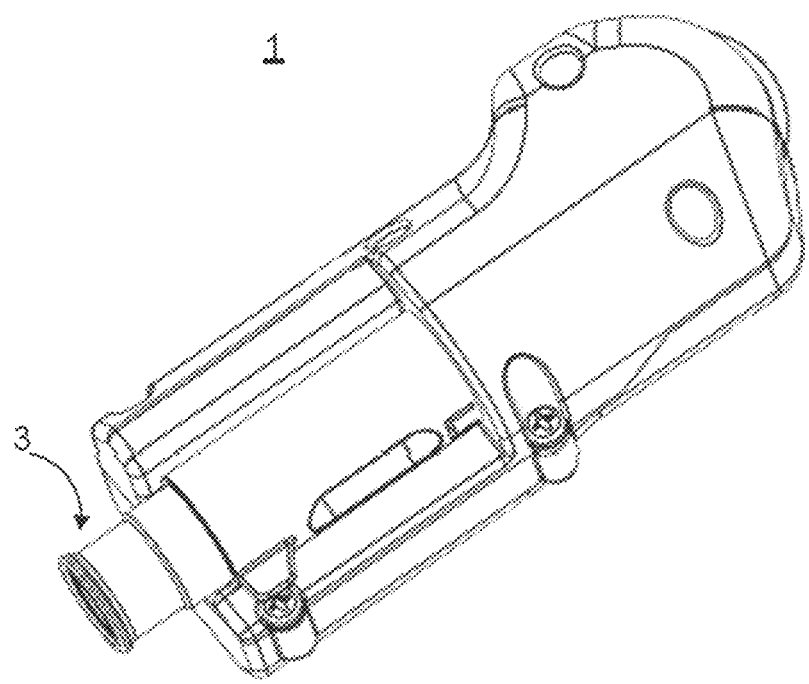
FIG. 3 shows the medicament delivery device in FIG. 1 when the front-end device has been attached to the base device.

FIG. 3 shows the medicament delivery device 1 when the front-end device 3 has been attached to the base device 5. The front-end device 3 is rotated after it has been inserted into the opening 5b, whereby the front-end device 3 becomes axially locked relative to the base device 5; such like a locking interface between the front-end device 3 and the base device 5 can be a thread or bayonet interface. Alternatively, the front-end device 3 can be axially locked relative to the base device 5 by linear movement of the front-end device 3, such like the locking interface between the front-end device 3 and the base device 5 can be a form-fit or snap-fit interface. The rear end 3b of the front-end device 3 can further arrange a coding member configured to match with a counter coding member arranged on the base device 5, such that the base device 5 can only be attached with a predetermined front-end device 3.

Figure 5:
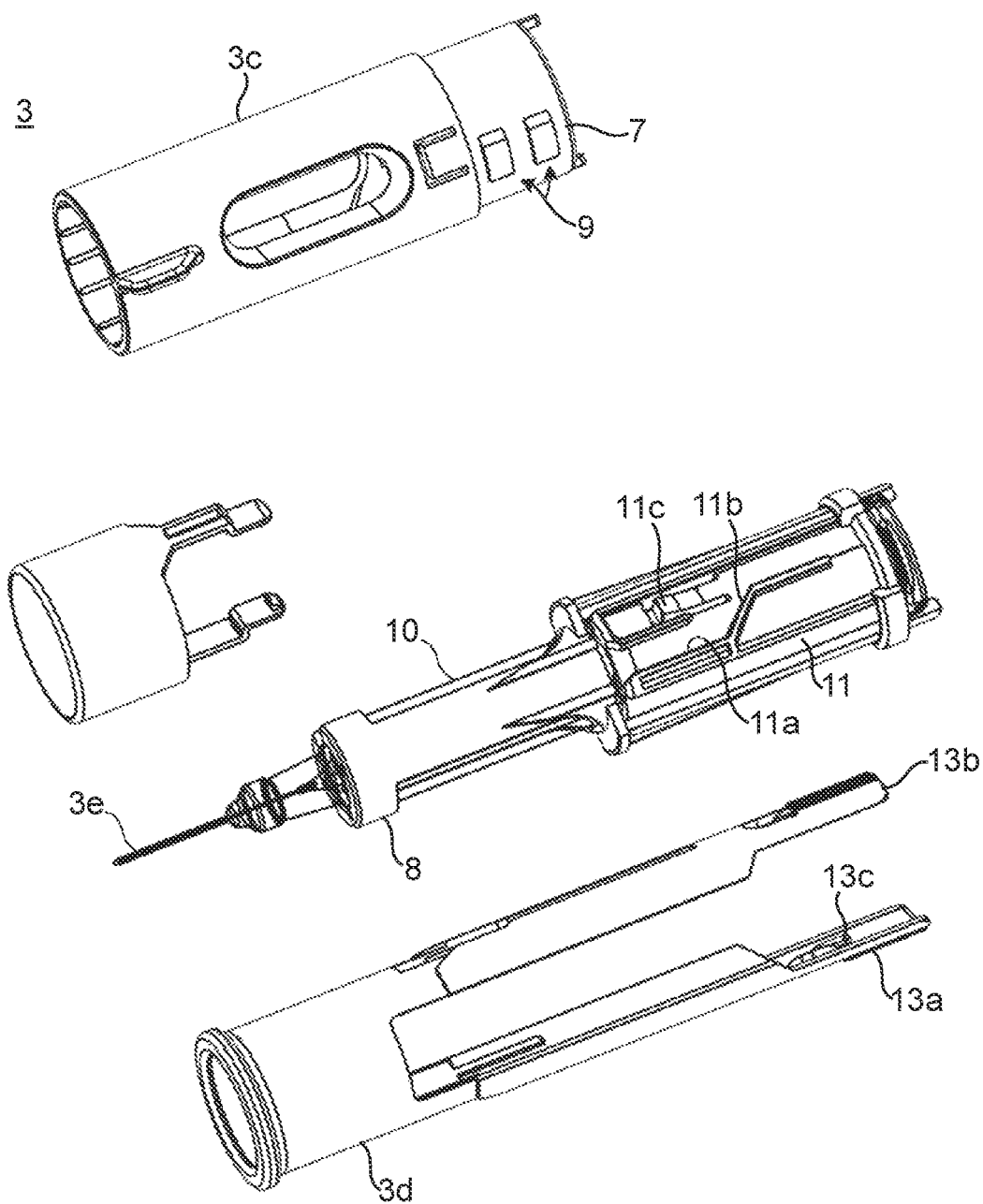
FIG. 5 shows internal components of the front-end device.

FIG. 5 shows components of the front-end device 3. The front-end housing 3c has a rear end portion 7 configured to be received inside the opening 5b of the base device 5. The rear end portion 7 is provided with a locking structure 9 configured to engage with an inner wall of the base housing 5a to lock the front-end housing 3c axially relative to the base device 5. The locking structure 9 may comprise one or more radially outwards extending protrusions provided on the outer surface of the rear end portion 7. The inner wall of the base housing 5a may be provided with corresponding slits or recesses configured to receive the one or more radially outwards extending protrusions when the front-end device 3 is rotated after the rear end 3b has been received by the opening 5b. In one example, the locking structure of the front-end housing and the recess of the base housing formed a bayonet connection, so that the front-end device can be fixed to the base device via the bayonet connection. The front-end housing 3c may further arranged a protrusion or rib on its outer surface as an anti-rolling feature to prevent the front-end device 3 from rolling on a flat surface before it has been assembled to the base device 5.

The front-end device 3 comprises a medicament container holder 8 configured to receive a medicament container 10. The front-end device 3 comprises a rotator 11. The rotator 11 may be generally tubular. The rotator 11 is arranged around a rear end portion of the medicament container 10. The medicament container 10 hence extends through the rotator 11.

The medicament container holder 8 comprises a tubular portion and at least two distally extended arms. Each of the distally extended arms comprise a recess arranged on its distal portion. Such that the flange of the medicament container is encompassed by the recesses on each of the distally extended arms when the medicament container is assembled to the medicament container holder 8. An enclosing member will then be further assembled to the medicament container holder 8 and encloses the outer surface of the distally extended arms and aligns with the recesses, such that the medicament container is therefore axially supported to the medicament container holder 8.

The rotator 11 is configured to cooperate with the delivery member cover 3d. The delivery member cover 3d is an elongate structure provided with two legs 13a, 13b extending towards the rear end 3b of the front-end device 3. The legs 13a, 13b are configured to cooperate with an external surface structure of the rotator 11. The external surface structure comprises two axial guide ribs 11a which transition into respective helical rib portions 11b in the axial direction towards the rear end 3b. The axial guide ribs 11a and helical rib portions 11b are configured to cooperate with a respective one of the legs 13a, 13b. Each leg 13a, 13b has a respective radial protrusion 13c extending radially inwards. The radially inwards extending protrusions 13c are configured to cooperate with the axial guide ribs 11a and helical rib portions 11b such that when the delivery member cover 3d is moved axially from the extended position towards the retracted position, the linear movement of the delivery member cover 3d is translated to a rotational motion of the rotator 11.

The rotator 11 comprises a radially flexible tab 11c configured to enable the delivery member cover 3d to move from the retracted position back to the extended position. The flexible tab 11c may have a generally ramp-like shape. The flexible tab 11c is flexed radially inwards to enable the corresponding protrusion 13c to move past the flexible tab 11c when the delivery member cover 3d is moved back towards the extended position from the retracted position. The flexible tab 11c prevents the delivery member cover 3c to move from the extended position towards the retracted position. Thus, when a medicament delivery has been performed, the delivery member cover 3d is maintained in the extended position to ensure that the front-end device 3 is used only once.

Figure 6:
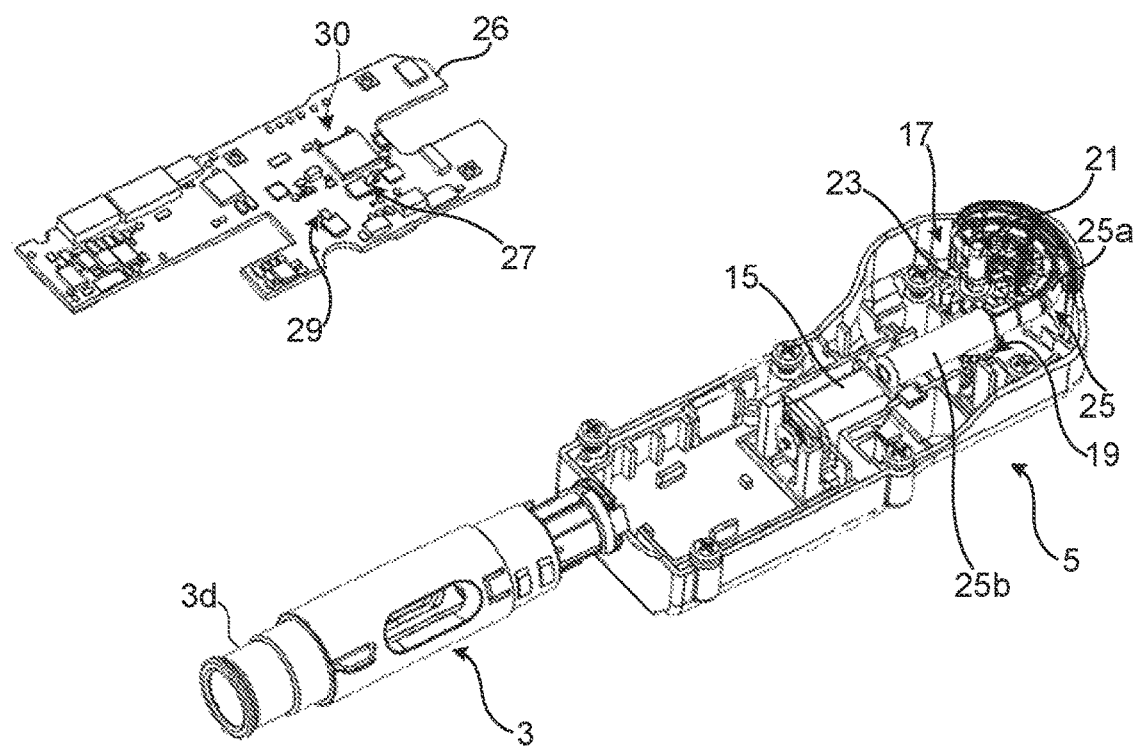
FIG. 6 shows various components of the medicament delivery device.

FIG. 6 shows the medicament delivery device 1 with the base housing 5a removed to expose the interior of the base device 5. The base device 5 includes a motor 15. The motor 15 forms part of the drive system of the base device 5. The motor 15 is preferably an electric motor. The base device 5 may also comprise a battery configured to power the motor 15. The base device 15 comprises a gear train 17 configured to be driven by the motor 15. The gear train 17 comprises bevel gears 19 configured to cause rotation of a shaft 21 that is perpendicular to the rotational axis of the motor 15. The gear train 17 may furthermore comprise a driving gear 23 provided around the shaft 21. The base device 5 comprises a plunger 25 comprising a plurality of segments 25a provided with rack teeth configured to engage with the driving gear 23. Alternatively, the plunger may comprise a wire plunger rod provided with rack teeth configured to engage with the driving gear 23.

The exemplified plunger 25 comprises a plunger rod member 25b attached to the segments 25a. The plunger rod member 25b is configured to extend into the medicament container 10 when the front-end device 3 is attached to the base device 5. Alternatively, the segments can be replaced by a flexible wire plunger connected to the plunger rod member 25b.

By operating the motor 15, the driving gear 23 is driven by the bevel gears 19. In turn, the driving gear 23 is configured to drive the plunger 25 to move between an initial end position and a second end position. The plunger 25 is set to be in the initial end position before the front-end device 3 is attached to the base device 5. The second end position is the position of the plunger 25 when the plunger 25 has been moved fully in the forward direction in the medicament container 10 when the front-end device 3 is attached to the base device 5. The motor 15 is driven in the forward direction when the plunger 25 is moved from the initial end position towards the second end position. The motor 15 is driven in a reverse direction when the plunger is moved from the second end position back towards the initial end position.

The base device 5 comprises a motor switch 27. The base device 5 comprises a circuit board 26. The motor switch 27 is in the present example arranged on the circuit board 26. The motor switch 27 is configured to be actuated between a default switch position and a first switch position. The motor switch 27 is configured to control the operation of the motor 15. The motor switch 27 is configured to be actuated by the delivery member cover 3d to move between the default switch position and the first switch position. The motor switch 27 is actuated by movement or displacement of the delivery member cover 3d between the extended position and the retracted position, as will be explained in more detail in the following.

The base device 5 comprises a connection switch 29. In the present example, the connection switch 29 is arranged on the circuit board 26. The connection switch 29 is configured to be actuated between an off position shown in FIG. 6 and an on position by the front-end device 3. By placing the front-end device 3 in the opening 5b of the housing 5a the rear end 3b of the front-end device 3 will bear against the connection switch 29, causing it to be actuated from the off position to the on position.

The circuit board 26 may further comprise electronics circuitry 30 and a user-feedback system configured to be powered by the battery. The electronics circuitry 30 may be configured to control the user-feedback system. The user-feedback system may for example comprise one or more visual feedback device such like light emitting diodes (LED), E-Ink, or liquid-crystal display (LCD) and/or an audio feedback device and/or a vibration motor for tactile feedback to indicate e.g. a dose end or misused warming. The connection switch 29 is configured to activate the electronics circuitry 30 when the connection switch 29 is set in the on position.

The circuit board 26 may further comprise a set of sensors configured to detect different events of the medicament delivery device 1 or the front-end device 3. Such like an optical scanner, or a RF reader configured to catch information from an information tag arranged on its distal end of the front-end device 3; an accelerometer and/or a gyroscope configured to detect the movement or the orientation of the medicament delivery device 1.

The circuit board 26 may further comprise a communication unit configured to wirelessly communicate with an external device, e.g. mobile phone. Such like transmitting sensed data related to the medicament delivery device or the information from the information tag to the external device; or receiving an instruction or information from the external device.

The operation of the medicament delivery device 1 will now be described with reference to FIGS. 7A-7D.

Figure 7A:
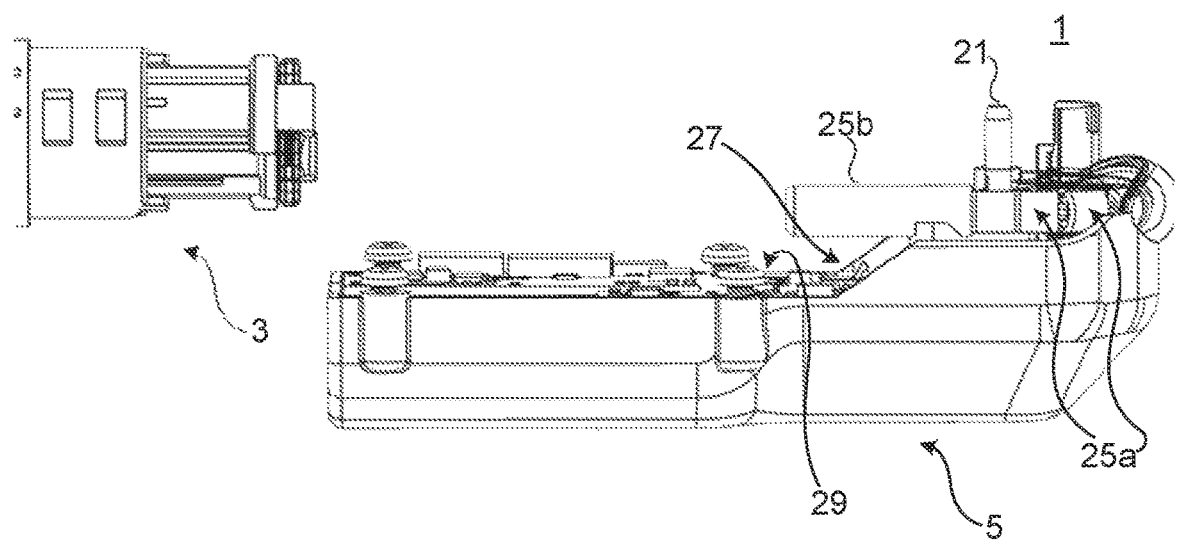
FIGS. 7A-D show the medicament delivery device in use.

In FIG. 7A the medicament delivery device 1 is shown without the base housing 5a before the front-end device 3 has been attached to the base device 5.

The motor switch 27 is set in the default switch position shown in FIG. 6. When the motor switch 27 is in the default switch position the motor 15 is in an off state.

The connection switch 29 is in the off position. The electronics circuitry 30 is hence not powered by the battery.

Figure 7B:
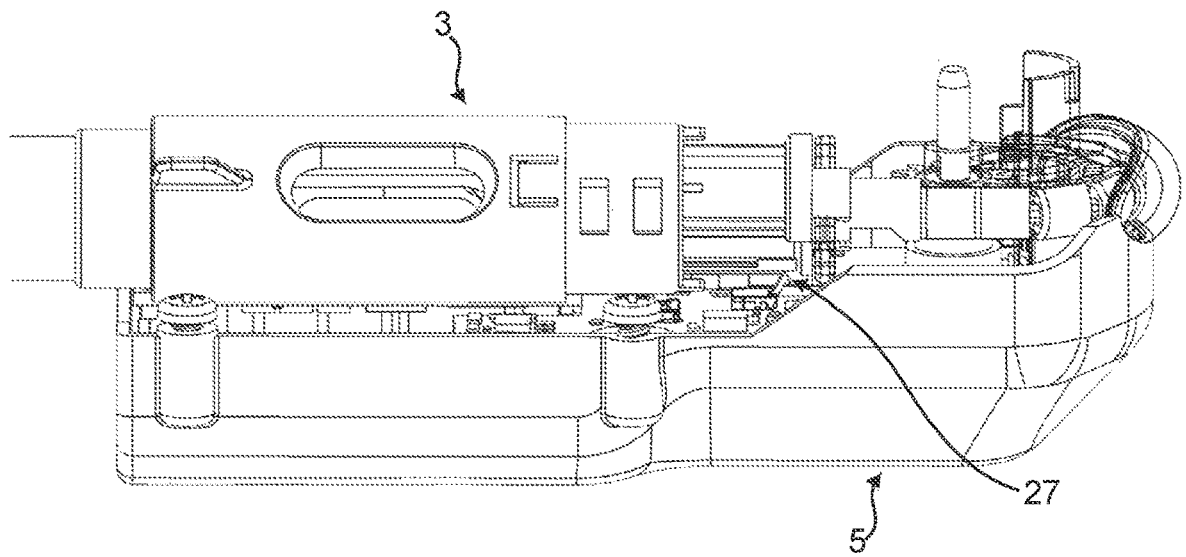

FIG. 7B shows the situation depicted in FIG. 2, i.e. when the front-end device 3 has been inserted into the opening 5b of the base housing 5a. The motor switch 27 is still set in the default switch position. The connection switch 29 may according to one example in this case still be set in the off position. Alternatively, the connection switch 29 may be actuated by the front-end device 3 as it is pushed into the opening 5b and thus set in the on position.

Figure 7C:
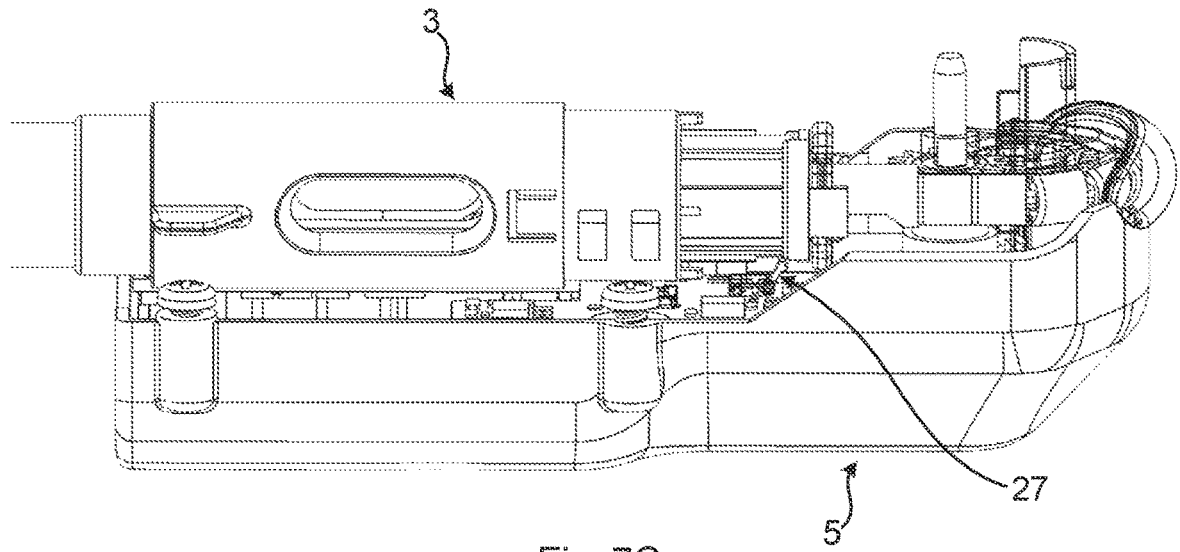

FIG. 7C shows the situation depicted in FIG. 3, i.e. when the front-end device 3 has been inserted into the opening 5b and rotated relative to the base device 5. The motor switch 27 is still in the default switch position. In one example, the connection switch 29 is configured to be set in the on position by rotation of the front-end device 3.

Figure 7D:
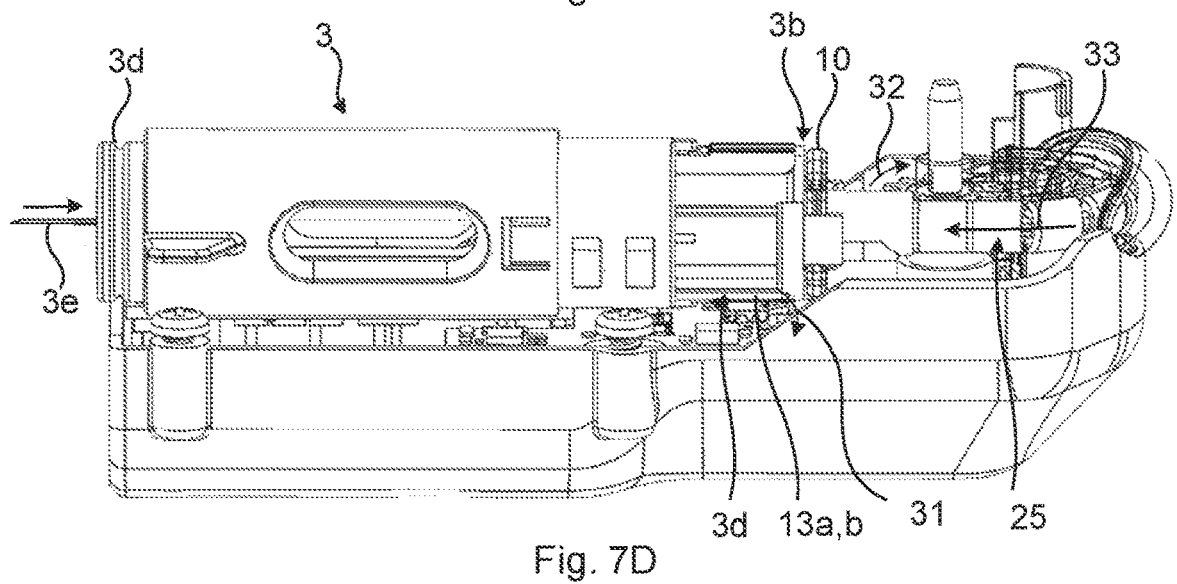

In FIG. 7D the delivery member cover 3d is moved in the direction towards the rear end 3b of the front-end device 3. This is typically done by placing the delivery member cover 3d towards the injection site and pressing the medicament delivery device 1 towards the injection site. The delivery member cover 3d is thus moved from the extended position towards the retracted position. One of the legs 13a, 13b of the delivery member cover 3d physically contacts the motor switch 27 as the delivery member cover 3d is moved towards the retracted position, causing the motor switch 27 to be actuated from the default switch position to the first switch position, as shown by arrow 31. The delivery member cover 3d bears against the motor switch 27 as long as the delivery member cover 3d is in the retracted position. The motor switch 27 is thus maintained in the first switch position.

The motor 15 is set to rotate in a forward direction, as shown by arrow 32, when the motor switch 27 is set in the first switch position. The plunger 25 is thereby moved forward, i.e. towards the front end 3a of the front-end device 3, inside the medicament container 10. The medicament contained in the medicament container 10 is thereby expelled through the delivery member 3e.

The motor 15 is configured to be turned off when the plunger 25 has moved from the initial end position to the second end position. The motor 15 will thus be in a standstill state when the plunger 25 has reached the second end position.

When the delivery member cover 3d is removed from the injection site, the delivery member cover 3d is returned from the retracted position to the extended position because of the forward biasing of the delivery member cover 3d. The delivery member cover 3d is thereby released from contact with the motor switch 27. The motor switch 27 is biased towards the default switch position. The motor switch 27 is thus set in the default switch position. This triggers the motor 15 to rotate in the reverse direction. The driving gear 23 is thus rotated in the reverse direction causing the plunger 25 to be moved in the reverse direction from the second end position back towards the initial end position.

It should be noted that, alternatively, the delivery member cover 3d may be arranged with a protruding member on its distal outer surface. The motor switch 27 may be arranged as a flipping member that can be pivotally moved between the default switch position and the first switch position. Such that once the delivery member cover 3d is moved towards the retracted position, the motor switch 27 is flapped by the protruding member, and thus moved from its default switch position into the first switch position. Further, once the delivery member cover 3d is moved towards the extended position from its the retracted position, the motor switch 27 is again flapped by the protruding member, and thus moved from its first switch position into the default switch position.

The exemplified base device 5 comprises a control unit configured to control the operation of the motor 15 based on the position of the motor switch 27 and on a parameter associated with the physical position of the plunger 25. The base device 5 may for example comprise a current detector configured to detect a motor current of the motor 15 and the control unit may be configured to control the operation of the motor 15 based on a level of the motor current. The above-mentioned parameter may hence for example be the motor current. For example, the motor current may exceed a threshold level when the plunger 25 reaches its two end positions, i.e. the initial end position and the second end position. The control unit may be configured to control the motor 15 to stop when the motor current reaches a level above the threshold.

According to one example, the base device 5 may comprise a position sensor configured to detect a position of the plunger 25. The parameter may in this case be the position of the plunger 25. The control unit may be configured to control the motor 15 to stop when the position sensor detects that the plunger 25 reaches the second end position or the initial end position.

The inventive concept has mainly been described above with reference to a few examples. However, as is readily appreciated by a person skilled in the art, other embodiments than the ones disclosed above are equally possible within the scope of the present disclosure concept, as defined by the appended claims.

The invention claimed is:

1. A medicament delivery device comprising:
    a front-end device comprising:
    a front-end housing and a delivery member cover configured to be moved along its longitudinal axis between an extended position and a retracted position relative to the front-end housing, and
    a medicament container holder arranged in the front-end housing, configured to receive a medicament container; and
    a reusable base device configured to be detachably connected to the front-end device, the base device comprising:
    a plunger,
    a motor configured to drive the plunger from an initial end position to a second end position, causing the plunger to move inside the front-end housing towards a front end of the front-end device, and wherein the motor is configured to drive the plunger from the second end position back to the initial end position,
    a motor switch configured to be actuated from a first switch position to a default switch position by displacement of the delivery member cover when the delivery member cover is moved back from the retracted position towards the extended position, the motor switch thereby causing the motor to start to rotate in a reverse direction and drive the plunger from the second end position back towards the initial end position, a control unit configured to control the motor to stop when the plunger has reached the second end position, and a position sensor configured to detect a position of the plunger, the control unit being configured to control the motor to stop in response to the position sensor detecting that the plunger attains the initial end position or the second end position.

2. The medicament delivery device as claimed in claim 1, wherein the motor switch is configured to be actuated from the default switch position to the first switch position by displacement of the delivery member cover when the delivery member cover is moved from the extended position towards the retracted position, the motor switch thereby causing the motor to start to rotate in a forward direction and drive the plunger from the initial end position towards the second end position.

3. The medicament delivery device as claimed in claim 1, wherein the control unit is configured to control the motor to stop when the plunger has reached the initial end position.

4. The medicament delivery device as claimed in claim 1, comprising a current detector configured to detect a motor current of the motor, the motor current increasing to a level above a threshold level when the plunger reaches any of the second end position and the initial end position, wherein the control unit is configured to control the motor to stop when the motor current reaches a level above the threshold level.

5. The medicament delivery device as claimed in claim 1, wherein the control unit is configured to control the motor to start to rotate in the reverse direction only when the motor is in a standstill state and the motor switch is actuated from the first switch position to the default switch position.

6. The medicament delivery device as claim 1, wherein the delivery member cover is configured to bear against the motor switch while the delivery member cover is in the retracted position to thereby keep the motor switch in the first switch position.

7. The medicament delivery device as claimed in claim 6, wherein the delivery member cover is configured to withdraw from contact with the motor switch when the delivery member cover is moved from the retracted position towards the extended position.

8. The medicament delivery device as claimed in claim 1, wherein the base device comprises a driving gear configured to be rotated by the motor, and wherein the plunger comprises a plurality of segments or the plunger comprises a wire plunger rod provided with rack teeth, the driving gear being configured to engage with the segments or rack teeth to drive the plunger between the initial end position and the second end position.

9. The medicament delivery device as claimed in claim 1, wherein the delivery member cover is biased towards the extended position.

10. The medicament delivery device as claimed in claim 1, wherein the front-end device is disposable.

11. The medicament delivery device as claimed in claim 1, wherein the medicament delivery device is an injector.

12. The medicament delivery device as claimed in claim 1, wherein the base device comprises electronic circuitry and a user-feedback system, wherein the electronic circuitry is configured to control the user-feedback system, and wherein the base device comprises a connection switch configured to detect when the front-end device is connected to the base device to thereby switch on the electronic circuitry.

13. A medicament delivery device comprising:
a disposable front-end device comprising:
a front-end housing having a longitudinal axis and a delivery member cover that moves along the longitudinal axis between an extended position and a retracted position relative to the front-end housing; and
a medicament container holder arranged in the front-end housing that holds a medicament container, and
a reusable base device that is detachably connected to the front-end device, the base device comprising:
a plunger;
a motor that drives the plunger from an initial end position to a second end position, where the plunger moves inside the front-end housing towards a front end of the front-end device, and where the motor drives the plunger from the second end position back to the initial end position;
a motor switch that is actuated from a first switch position to a default switch position when the delivery member cover is moved back from the retracted position towards the extended position, where the motor switch causes the motor to start to rotate in a reverse direction and the plunger to move from the second end position back towards the initial end position,
wherein the motor switch is actuated from the default switch position to the first switch position when the delivery member cover is moved from the extended position towards the retracted position, where the motor switch causes the motor to start to rotate in a forward direction to drive the plunger from the initial end position towards the second end position,
a control unit that controls the motor to stop when the plunger has reached the second end position, and
a position sensor that detects a position of the plunger, wherein the control unit controls the motor to stop in response to the position sensor detecting that the plunger attains the initial end position or the second end position.

14. The medicament delivery device as claimed in claim 13, further comprising a current detector that detects a motor current of the motor when the motor current increases to a level above a predetermined threshold level.

15. The medicament delivery device as claimed in claim 13, wherein when the plunger reaches any of the second end position and the initial end position the control unit controls the motor to stop when the motor current reaches a level above the predetermined threshold level.

16. The medicament delivery device as claimed in claim 13, wherein the control unit controls the motor to start to rotate in the reverse direction only when the motor is in a standstill state and the motor switch is actuated from the first switch position to the default switch position.

* * * * *